United States Patent
Jun (10) Patent No.: US 12,555,391 B2
(45) Date of Patent: Feb. 17, 2026

(54) DRIVING VIDEO RECORDING SYSTEM FOR VEHICLE AND CONTROLLING METHOD OF THE SAME

(71) Applicants: Hyundai Motor Company, Seoul (KR); Kia Corporation, Seoul (KR)

(72) Inventor: Sung Hwan Jun, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 25 days.

(21) Appl. No.: 18/521,578

(22) Filed: Nov. 28, 2023

(65) Prior Publication Data
US 2024/0420486 A1   Dec. 19, 2024

(30) Foreign Application Priority Data
Jun. 19, 2023   (KR) .................. 10-2023-0078305

(51) Int. Cl.
*G06V 20/56*   (2022.01)
*H04N 5/52*   (2006.01)

(52) U.S. Cl.
CPC ............. *G06V 20/588* (2022.01); *H04N 5/52* (2013.01)

(58) Field of Classification Search
CPC .... H04N 19/126; H04N 19/17; H04N 19/174; H04N 19/436; H04N 19/46; H04N 19/61; H04N 19/70; H04N 19/172; H04N 19/176; H04N 19/184; H04N 19/119; H04N 19/129
USPC ........................................... 348/148
See application file for complete search history.

(56) References Cited

U.S. PATENT DOCUMENTS

| | | | |
|---|---|---|---|
| 11,043,023 B2* | 6/2021 | Ashley | G06T 17/00 |
| 11,544,895 B2* | 1/2023 | Bruns | G06T 15/10 |
| 2019/0116315 A1* | 4/2019 | Satomi | H04N 23/90 |
| 2021/0016709 A1* | 1/2021 | Ihlenburg | B60R 1/27 |
| 2022/0081267 A1* | 3/2022 | Chalavon | B66D 3/043 |
| 2022/0086400 A1* | 3/2022 | Sugawara | H04N 7/181 |
| 2022/0118993 A1* | 4/2022 | Schneider | B60W 50/10 |
| 2023/0311818 A1* | 10/2023 | Uchiyama | B60Q 1/143 |
| | | | 239/284.2 |
| 2024/0271953 A1* | 8/2024 | Jang | G06T 19/006 |

* cited by examiner

*Primary Examiner* — Gims S Philippe
(74) *Attorney, Agent, or Firm* — Fox Rothschild LLP (57) ABSTRACT

A driving video recording system includes a camera module for monitoring surroundings of a vehicle, a first memory for storing an image transmitted from the camera module, a second memory for storing a computer program for controlling storage of the image, and a controller including a processor to execute the computer program. The processor determines whether a view condition is satisfied through execution of the computer program, selects one of a first region or a second region for a field of view of the camera module according to the determination, and stores the image obtained by the camera module according to the selection.

16 Claims, 10 Drawing Sheets

DRIVING VIDEO RECORDING SYSTEM FOR VEHICLE AND CONTROLLING METHOD OF THE SAME

CROSS-REFERENCE TO RELATED APPLICATION

The present application claims under 35 U.S.C. § 119(a) the benefit of Korean Patent Application No. 10-2023-0078305, filed on Jun. 19, 2023, the entire contents of which are incorporated herein by reference.

BACKGROUND

(a) Technical Field

The present disclosure relates to a driving video recording system for a vehicle and a controlling method thereof.

(b) Description of the Related Art

A driving video recording system is a system that records an image of a driving situation of a vehicle, for example.

To this end, the driving video recording system may include a controller, a memory for storing an image, and a camera for capturing the image.

In general, the driving video recording system stores vehicle driving data together with an image around a vehicle while driving and records an image according to a predetermined input setting when a predetermined event is sensed during parking.

The driving video recording system was initially called a black box and was only installed as an external type, but recently, it has already been built into a vehicle before the vehicle is released.

The built-in type is more advantageous than the external type in that it can access driving data of the host vehicle and can be connected to other controllers, and its use is expected to gradually increase.

SUMMARY

An objective of the present disclosure is to provide a driving video recording system for recording and storing a range of images differently according to driving conditions.

Another objective of the present disclosure is to provide a driving video recording system capable of recording more information by expanding and storing a range in a predetermined driving situation.

According to an embodiment of the present disclosure, there is provided a control method of a driving video recording system comprising a camera module for monitoring the surroundings of a vehicle, a first memory for storing an image transmitted from the camera module, a second memory for storing a computer program for controlling storage of the image, and a controller comprising a processor for executing the computer program, wherein the method comprises determining, by the processor, whether a view condition is satisfied through the execution of the computer program, selecting any one of a first region or a second region for a field of view (FOV) of the camera module according to the determination, and determining to store an image obtained by the camera module according to the selection.

In at least one embodiment of the present disclosure, the view condition includes a horizontal-view expansion condition and/or a vertical-view expansion condition.

In at least one embodiment of the present disclosure, the horizontal-view expansion condition includes at least one of a condition that the number of lanes of a road on which the vehicle travels is equal to or greater than a threshold number of lanes, a condition that the vehicle enters an intersection or a circular road, a condition that the speed of the vehicle is equal to or greater than a threshold speed, a condition that a steering angle or a yaw angle is equal to or greater than a threshold angle, or a condition that a warning situation of an Advanced Driving Assistance System (ADAS) occurs.

In at least one embodiment of the present disclosure, the second region includes a horizontal expansion region having a horizontal length greater than the first region.

In at least one embodiment of the present disclosure, the vertical-view expansion condition includes a condition of one of entering or exiting a slope.

In at least one embodiment of the present disclosure, the condition of entering or exiting the slope is determined according to one of a pitch change amount of the vehicle or a load change amount of the front and rear dampers.

In at least one embodiment of the present disclosure, the second region includes a vertical expansion region having a vertical length greater than the first region.

In at least one embodiment of the present disclosure, the method further comprises determining, by the processor, whether it is a daytime time zone in addition to the view condition.

In at least one embodiment of the present disclosure, the method further comprises allowing, by the processor, selection of the second area when the time zone is the daytime time zone.

In at least one embodiment of the present disclosure, the method further comprises determining, by the processor, whether the time zone is the daytime time zone by using an auto gain control (AGC) gain value of the camera module.

The driving video recording system according to an embodiment of the present disclosure comprises a camera module for monitoring the surroundings of a vehicle, a first memory for storing an image transmitted from the camera module, and a controller including a second memory for storing a computer program for controlling the storage of the image, and a processor for executing the computer program, wherein the processor is configured to determine whether a view condition is satisfied through the execution of the computer program, select one of a first region and a second region for a field of view (FOV) of the camera module according to the determination, and determine to store the image obtained by the camera module according to the selection.

The view condition may include at least one of a horizontal-view expansion condition or a vertical-view expansion condition.

The horizontal-view expansion condition may include at least one of a condition that the number of lanes of a road on which the vehicle is traveling is equal to or greater than a threshold number of lanes, a condition that the vehicle enters a crossroad or a circular road, a condition that the vehicle speed is equal to or greater than a threshold speed, a condition that a steering angle or a yaw angle is equal to or greater than a threshold angle, or a condition that the vehicle is in an advanced driving assistance system (ADAS) warning situation.

The second region may include a horizontal expansion region having a horizontal length greater than that of the first region.

The vertical-view expansion condition of the driving video recording system according to at least one embodiment of the present disclosure includes a condition of entering or exiting a slope.

In the driving video recording system according to at least one embodiment of the present disclosure, the condition that the vehicle enters or exits the slope is determined according to a pitch change amount of the vehicle or a load change amount of the front and rear dampers.

The second region includes a vertical expansion region having a vertical length greater than that of the first region.

In the driving video recording system according to at least one embodiment of the present disclosure, the processor is further configured to determine whether it is a daytime time zone in addition to the view condition.

In the driving video recording system according to at least one embodiment of the present disclosure, the processor is further configured to allow the selection of the second region in the case of the daytime time zone.

The processor may be further configured to determine whether the current time zone is the daytime time zone using an auto gain control (AGC) gain value of the camera module.

One embodiment of the present disclosure can effectively record more information even in a storage capacity limit of a memory by narrowly storing the range in a normal driving situation and by expanding and storing the range in a set situation.

A vehicle may include the driving video recording system.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN). Since the present disclosure may be modified in various ways and have various embodiments, specific embodiments will be illustrated and described in the drawings. However, this is not intended to limit the present disclosure to specific embodiments, and it should be understood that the present disclosure includes all modifications, equivalents, and replacements included on the idea and technical scope of the present disclosure.

Terms including ordinals such as "first," "second," and the like may be used to describe various elements, but the elements are not limited by the terms. The terms are used only for the purpose of distinguishing one element from another element.

The term "and/or" is used to include any combination of a plurality of items to be included. For example, "A and/or B" includes all three cases such as "A", "B", and "A and B".

When an element is "connected" or "linked" to another element, it should be understood that the element may be directly connected or connected to another element, but another element may exist in between.

Unless otherwise defined, all terms used herein, including technical or scientific terms, have the same meaning as that generally understood by those skilled in the art. It will be understood that terms, such as those defined in commonly used dictionaries, should be interpreted as having a meaning that is consistent with their meaning in the context of the relevant art and will not be interpreted in an idealized or overly formal sense unless expressly so defined herein.

Meanwhile, the processor includes a semiconductor integrated circuit and/or electronic devices that perform at least one or more of comparison, determination, calculation, and determination in order to achieve a programmed function. For example, the processor may be a computer, a microprocessor, a CPU, an ASIC, and a circuitry (logic circuits), or a combination thereof.

In addition, the computer-readable recording medium (or simply referred to as a memory) includes all types of storage devices in which data that can be read by a computer system is stored. For example, the memory may include at least a memory type of a flash memory, of a hard disk, of a microchip, of a card (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

The recording medium is electrically connected to the processor, and the processor retrieves and records data from the recording medium. The recording medium and the processor may be integrated or may be physically separated.

Hereinafter, the embodiments of the present disclosure will be described in detail with reference to the accompanying drawings.

Figure 1:
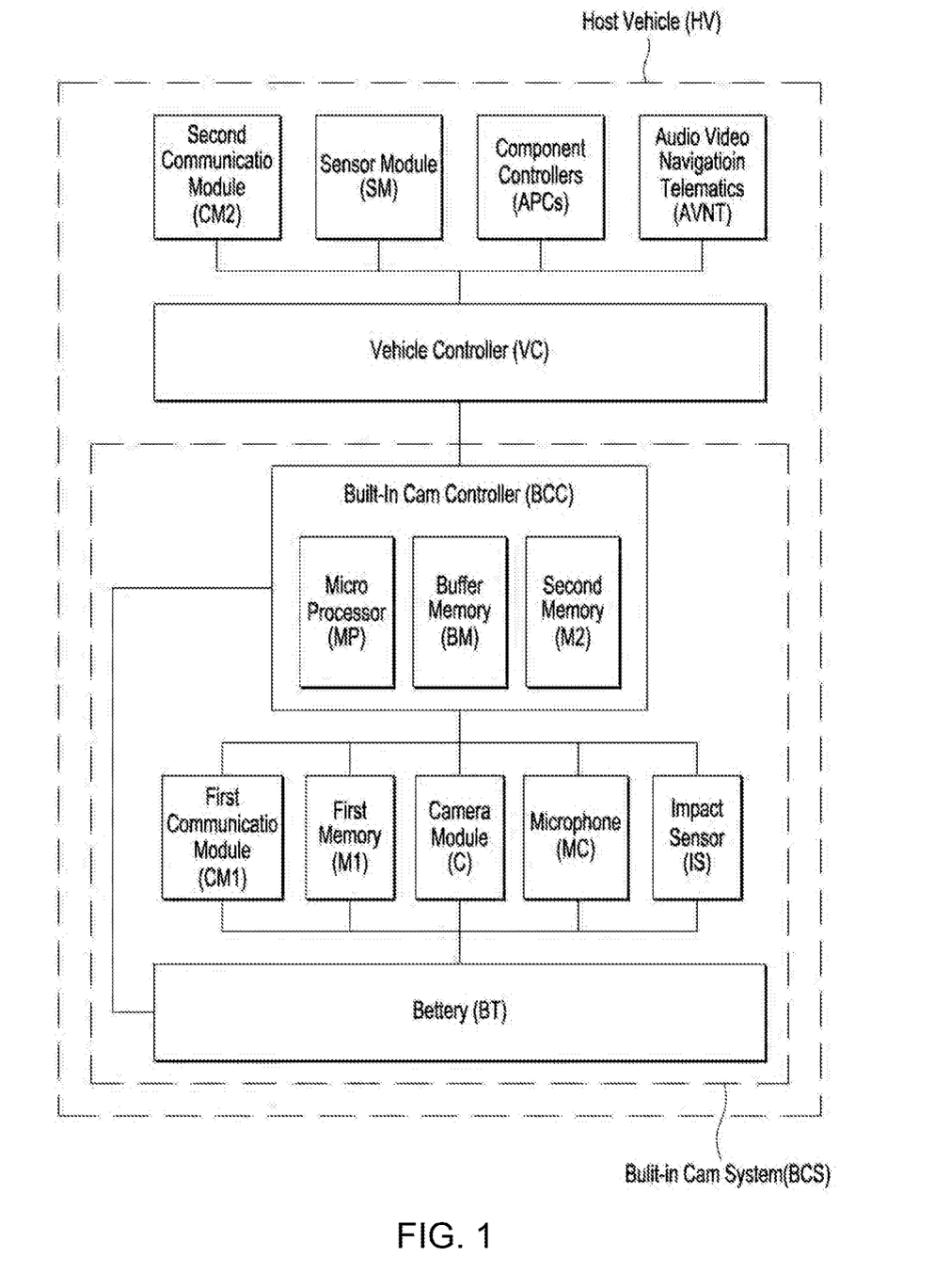
FIG. 1 is a block diagram conceptually showing a feature of a driving video recording system according to an embodiment of the present disclosure.

Referring to FIG. 1, the built-in driving video recording device, namely, a built-in cam system BCS, according to an embodiment of the present disclosure is installed in a host vehicle HV, and includes a camera module C, a computer-readable storage medium M1, a first communication module CM1, a microphone MC, an impact sensor IS, a power auxiliary battery BT, and a built-in cam controller BCC.

The driving video recording device of the present embodiment is a built-in type, but it is not necessarily limited thereto.

First, the camera module C includes a front camera and a rear camera in this embodiment, but it is not necessarily limited thereto. The front camera is installed to capture an video (or image) of the front area of the vehicle HV and to capture a video of the rear area of the vehicle HV.

For example, the front camera may be installed at a position adjacent to the room mirror in the vehicle HV cabin of the window shield, and the rear camera may be installed on the rear window of the vehicle HV cabin or the rear bumper.

For example, the front camera and the rear camera have the video quality of one of an HD, an FHD, or a Quad HD.

It is evident that the front camera and the rear camera do not need to have the same video quality, and a camera of an Advanced Drive Assistance System (ADAS) system of the host vehicle HV may be used.

Further, the camera has an aperture value of f/2.0 or less, preferably f/1.6 or less. If the aperture value decreases, more light is gathered so that recording may be made brighter. In addition, by applying image tuning technology to minimize the noise and the loss of light, clear recording is possible even in a dark environment.

In addition, the computer-readable recording medium includes all types of storage devices in which data that can be read by a computer system is stored. For example, the memory may include at least a memory type of a flash memory, of a hard disk, of a microchip, of a card (e.g., a Secure Digital (SD) card or an eXtream Digital (XD) card), etc., and at least a memory of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk In this embodiment, the memory M1 is an external type of 64 gigabyte or a Micro SD of more thereof. For example, constant recording while driving can be performed for several hours, and constant recording while parking may be performed up to tens of hours. In addition, event recording according to impact detection may be performed up to tens of times.

The user can easily check the contents stored in the memory in a desktop computer or the like by extracting the SD card.

The information of the state of the SD card can be checked through the connected car service, and the time of replacement according to the memory state can also be checked.

The first communication module CM1 is for wired or wireless communication with the exterior and is not limited to communication protocol.

In the present embodiment, the first communication module CM1 includes a communication device capable of directly communicating with nearby devices, and illustratively supports Wi-Fi Direct. Wi-Fi Direct is a standard Wi-Fi that allows systems to be connected easily without a wireless access point. Wi-Fi Direct is generally available from Internet search to file transfers and can simultaneously communicate with one or more devices at a general Wi-Fi speed level.

Due to Wi-Fi direct, the user can easily and quickly access the built-in cam through, for example, a smartphone.

The microphone MC supports voice recording. When the driving videos of the vehicle HV is recorded, not only the videos are recorded but also the voices are recorded as well.

The impact sensor IS senses an external impact, and for example, may be a one-axis or a three-axis acceleration sensor.

The impact sensor IS may be prepared in the built-in cam system BCS for exclusive use, but it is evident that an acceleration sensor installed in the host vehicle HV may be used.

The signal of the impact sensor IS may be the reference of the starting point for a later described event recording, and the degree of impact serving as the reference thereof can be predetermined by the user.

For example, the user can select an impact detection sensitivity which is the reference for event recording when setting up the built-in cam system BCS through a display screen (e.g., a later described AVNT screen) in the vehicle HV.

Illustratively, the impact detection sensitivities are divided into five levels: the first level (highly unresponsive), the second level (unresponsive), the third level (normal sensitivity), the fourth level (sensitive), and the fifth level (highly sensitive).

The built-in cam system BCS can receive power from a battery (e.g., a 12 V battery) installed in the vehicle HV.

Although the system is operated by receiving power of the vehicle HV battery during parking as well as during driving, there may be an over-consumption problem of the vehicle HV battery, and thus, the present embodiment includes the power auxiliary battery BT.

In the present embodiment, the built-in cam system BCS receives power from any one of the battery of the vehicle HV, the alternator in the case of the internal combustion engine vehicle, or the lower DC/DC converter in the case of the electric vehicle, while receiving power from the power auxiliary battery BT during parking.

The power auxiliary battery BT is charged and discharged depending on an operating environment of the vehicle HV and supplies optimal power for recording and OTA software update during parking.

The charging of the power auxiliary battery BT is performed by a vehicle HV battery (a low voltage battery or a high voltage battery of an electric vehicle), or performed by an alternator in the case of an internal combustion engine vehicle HV.

The charging of the power auxiliary battery BT is performed by a vehicle HV battery (a low voltage battery or a high voltage battery of an electric vehicle), or performed by an alternator in the case of an internal combustion engine vehicle HV.

The built-in cam controller BCC is a superior controller that controls other components of the built-in cam system BCS, and it exchanges signals with one of the controller VC of the host vehicle HV and a second communication module CM2 (vehicle communication module), the sensor module SM, the component controllers APCs, and the audio video navigation telematics (AVNT), etc.

Here, the sensor module SM includes at least one of a speed sensor, an acceleration sensor, a vehicle position sensor (e.g., a GPS receiver), a steering angle sensor, a yaw rate sensor, a pitch sensor, or a roll sensor, and the component controllers APCs may include at least one of a light lamp controller for direction indication, a turn signal controller, a wiper controller, an ADAS system controller, or an airbag controller.

The built-in cam controller BCC controls other components to perform constant recording during driving, constant recording during parking, and recording events to be recorded according to impact detection signals, etc.

During recording, driving information of the vehicle HV may be recorded as well.

Here, the vehicle HV driving information includes time, vehicle speed, gear position, turn signal information, degree of detected impact (one corresponding to the above-described five steps), global positioning system GPS position information, etc.

The vehicle driving information is received from the vehicle controller VC, but it is evident that it may also be directly received from a corresponding module or component of the vehicle HV. For example, the vehicle speed may be directly received from a speed sensor of the vehicle HV, the turn signal information (or turn signal information from a turn signal controller) may be directly received from a turn signal controller, and the GPS position information may be received from a AVNT or a GPS receiver.

As described above, the event recording is performed when the occurring event is detected during parking, depending on the sensitivity of the detected impact predetermined by the user.

In case of recording events, recording is performed from a predetermined time before the time of the occurring event to a predetermined time after the time of the occurring event, and the predetermined time is selected by the user.

The AVNT is connected to the built-in cam controller BCC through the vehicle controller VC or directly, and the AVNT screen functions as a user interface for receiving various setting parameters of the built-in cam system BCS from the user.

The built-in cam controller BCC transmits recorded content to an external server according to a predetermined cycle, a user selection, or an event (e.g., a degree of detected impact) predetermined by a user.

The built-in cam controller BCC includes a memory M2 and a processor MP to perform its functions.

In an embodiment, the processor MP includes a semiconductor integrated circuit and/or electronic elements that perform at least one of comparing, determining, calculating, or determining to achieve a programmed function. Illustratively, the processor may be any one or a combination of a computer, a microprocessor, a CPU, an ASIC, and a circuitry (or logic circuits).

The memory M2 may be any type of storage device that stores data that can be read by a computer system, and may include, for example, at least a memory type of a flash memory, a hard disk, a microchip, a card (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

Operating software of the BCC is stored in the memory M2, and the processor MP reads and executes the corresponding software to perform the function of the BCC.

In addition, the built-in cam controller BCC includes a buffer memory BM for determination, calculation, and the like in the processor MP.

Figure 2:
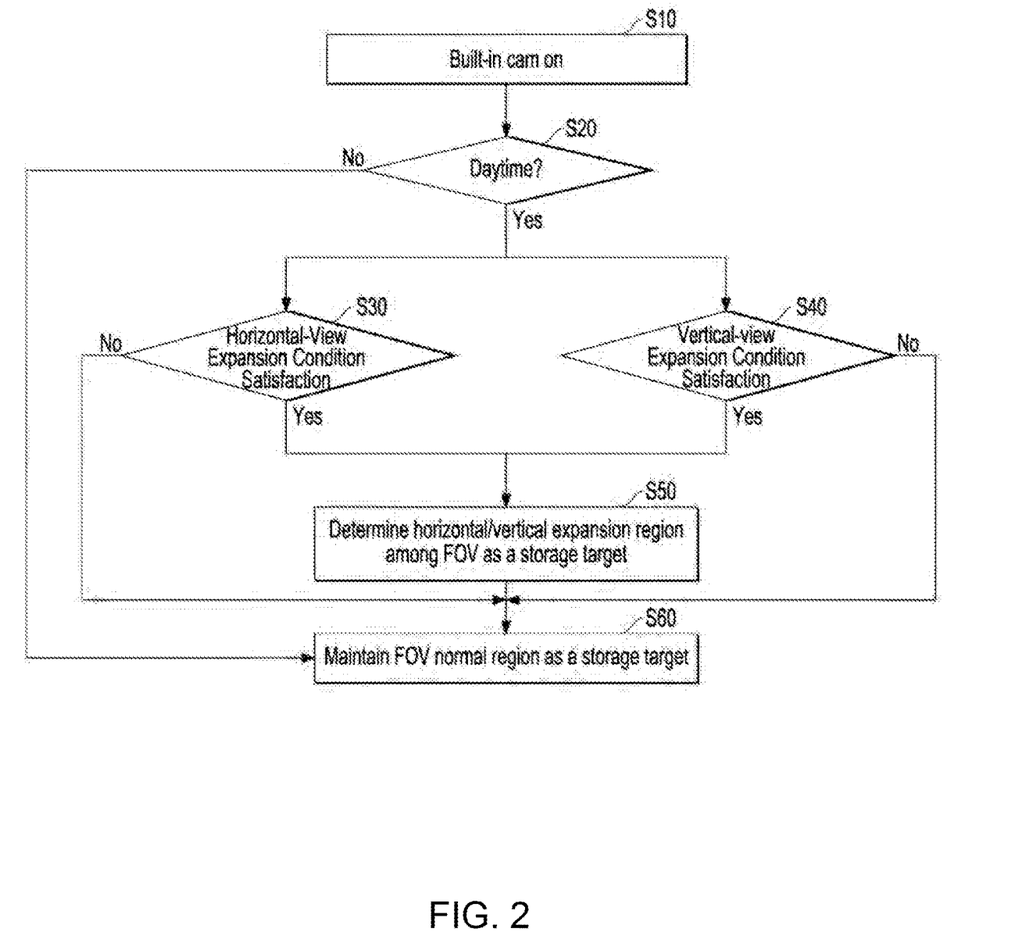
FIG. 2 is a flowchart illustrating a control method of a driving video recording system according to an embodiment of the present disclosure.

FIG. 2 is a flowchart illustrating a control method according to an embodiment of the present disclosure, and the control method will be described in detail through the flowchart.

First, step S10 represents that the built-in cam BCS is in an on state.

For example, the built-in cam controller BCC may manage the built-in cam BCS in an on state, a sleep state, an off state, or the like according to a power use state thereof.

The ON state is an active state in which power is supplied to the entirety of the built-in cam BCS, and is a state in which recording can be performed at all times or event times, and the sleep state is a state in which only a minimum amount of power is maintained to reduce power consumption, and is similar to a sleep state of a general electric system, and the OFF state may be defined as a state in which the use of power is blocked.

In the sleep state, video recording may not be performed, and the state may be switched to the on state when a set condition is satisfied.

In step S20, the built-in cam controller BCC may determine whether the current time is daytime.

To this end, the built-in cam controller BCC may determine whether the gain value of the auto gain control (AGC) received from the camera module C is equal to or less than the predetermined value.

In step S20, when it is determined that it is daytime, the view condition is determined, otherwise, step S60 is performed.

In the case of night, the quality of a video may be deteriorated, so the expansion of the storage region is limited.

The built-in cam controller BCC records a video as the first region when any one of the daytime time condition or the view condition is not satisfied in the video recording range, and records the video as the second region when both of the two conditions are satisfied. The first region has a smaller size than the second region, and in the present embodiment, the first region is a normal region, and the second region is an expanded region.

Figure 5:
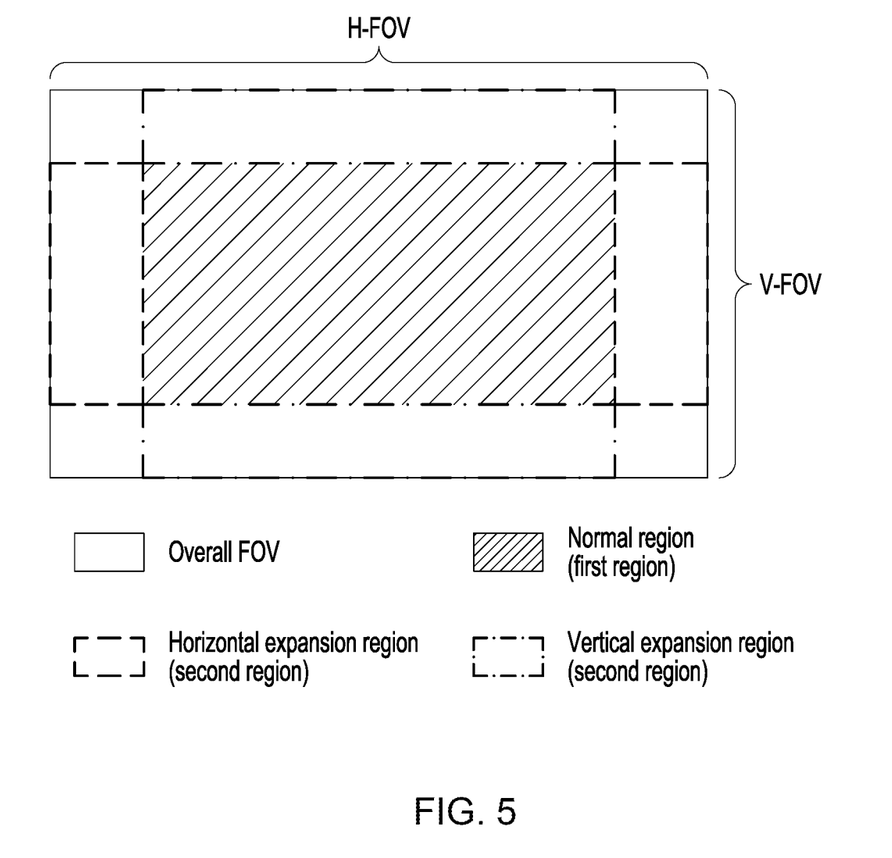
FIG. 5 illustrates a field of view, a first region, and a second region of the present embodiment.

In the present embodiment, the entire field of view FOV of the camera module C may be defined by a horizontal FOV and a vertical FOV, as shown in FIG. 5. In addition, the image primarily obtained from the image sensor of the camera module C may be an image to the entire FOV, and the first region or the second region of the image is finally stored.

In the present embodiment, the second region includes a horizontal expansion region and/or a vertical expansion region. The horizontal expansion region is defined as a region that is maximally expanded from the normal region to the horizontal FOV and the vertical expansion region is defined as a region that is maximally expanded to the vertical FOV, but the present disclosure is not necessarily limited thereto.

In the present embodiment, a memory capacity limit may be satisfied by storing the first region in a general situation, and more information may be recorded in an important situation by storing the expanded second region in a predetermined situation.

In general, an image near an edge among images of the entire FOV may have distortion of data stored in a corresponding pixel of an image sensor.

The first region may be defined as a region in a range without such distortion, and in a general situation, the memory capacity limitation is overcome by storing the first region.

However, when image information in a further extended range is required despite data distortion, the image information for an important situation may be increased by expanding and storing the image information in the second region.

Referring back to FIG. 2, in the present embodiment, the view condition includes a horizontal-view expansion condition and a vertical-view expansion condition.

In step S30, the built-in cam controller BCC may determine whether the horizontal-view expansion condition is satisfied.

If the horizontal-view expansion condition is satisfied, the built-in cam controller BCC determines a horizontal expansion region as a storage target with respect to the captured image of the camera module C in step S50, and if not, the process proceeds to step S60.

In step S40, the built-in cam controller BCC may determine whether the vertical-view expansion condition is satisfied.

When the vertical-view expansion condition is satisfied, the built-in cam controller BCC determines a vertical expansion region as a storage target with respect to the captured image of the camera module C in step S50, and otherwise, the process proceeds to step S60.

Figure 3:
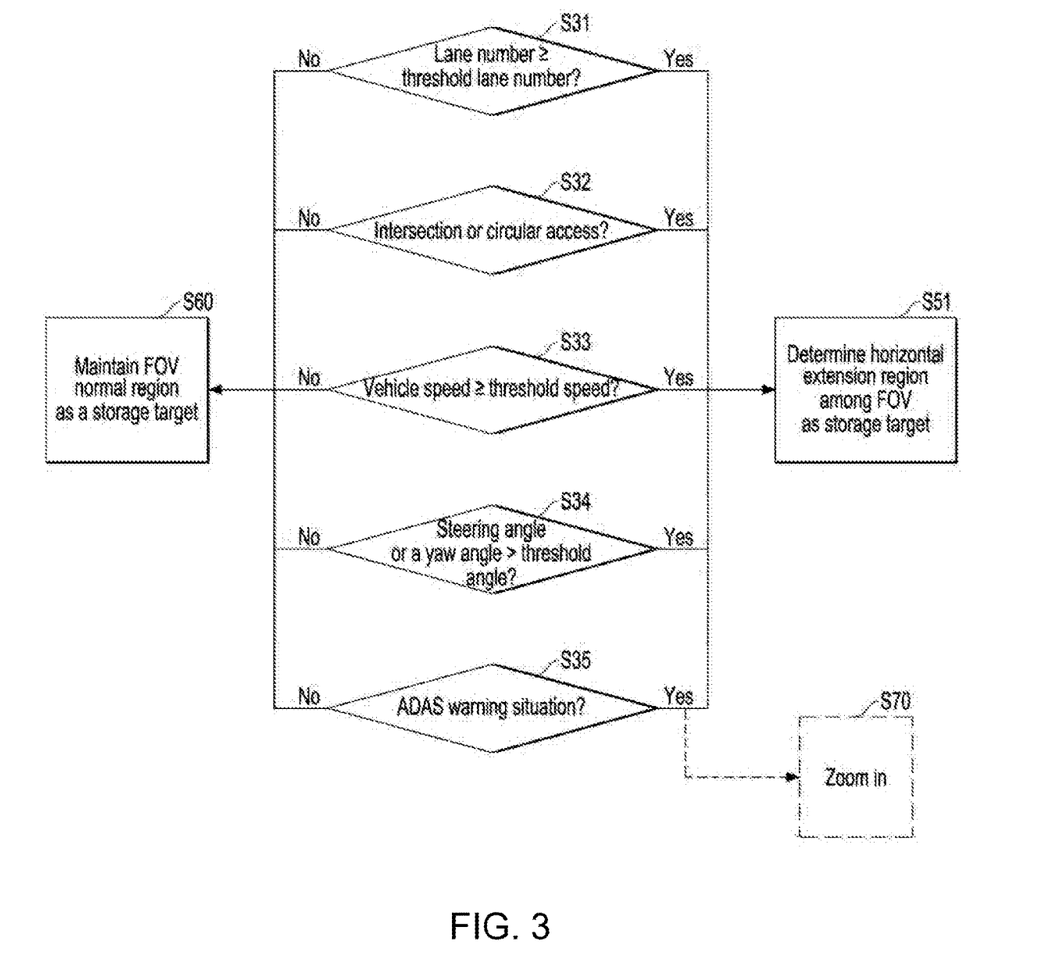
FIG. 3 is a flowchart illustrating a horizontal-view expansion condition and a word according thereto according to an embodiment of the present disclosure.

As shown in FIG. 3, the horizontal-view expansion condition includes at least one of a condition that the number of lanes of a road on which the vehicle travels is equal to or greater than a threshold number of lanes, a condition that the vehicle enters an intersection or a circular road, a condition that a vehicle speed is equal to or greater than a threshold speed, a condition that a steering angle or a yaw angle is equal to or greater than a threshold angle, or a condition that an Advanced Driving Assistance System (ADAS) warning situation occurs.

In order to determine the above conditions, the built-in cam controller BCC may receive, from the AVNT, information on the number of lanes of the driving road and/or information on whether the vehicle enters the intersection or the circular road (or intersection or circular road position information and position information of the vehicle).

Also, the built-in cam controller BCC may receive the vehicle speed from the vehicle speed sensor, the steering angle from the steering angle sensor, the yaw angle from the yaw rate sensor, and the warning situation information from the ADAS system controller.

If at least one of the above-described horizontal-view expansion conditions is satisfied, the built-in cam controller BCC determines the horizontal expansion area as the storage region of the captured image in step S51.

However, if all of the above-described horizontal-view expansion conditions are not satisfied, the process proceeds to step S60 to determine the normal region as the storage target.

Meanwhile, the built-in cam controller BCC may make a zoom-in decision on the captured image of the camera module C according to the information received from the ADAS system controller and store the zoomed-in image.

For example, when the collision warning situation information with the preceding vehicle is received from the ADAS system controller, the zoom-in image may be stored to further increase visibility of the license plate of the preceding vehicle.

Figure 4:
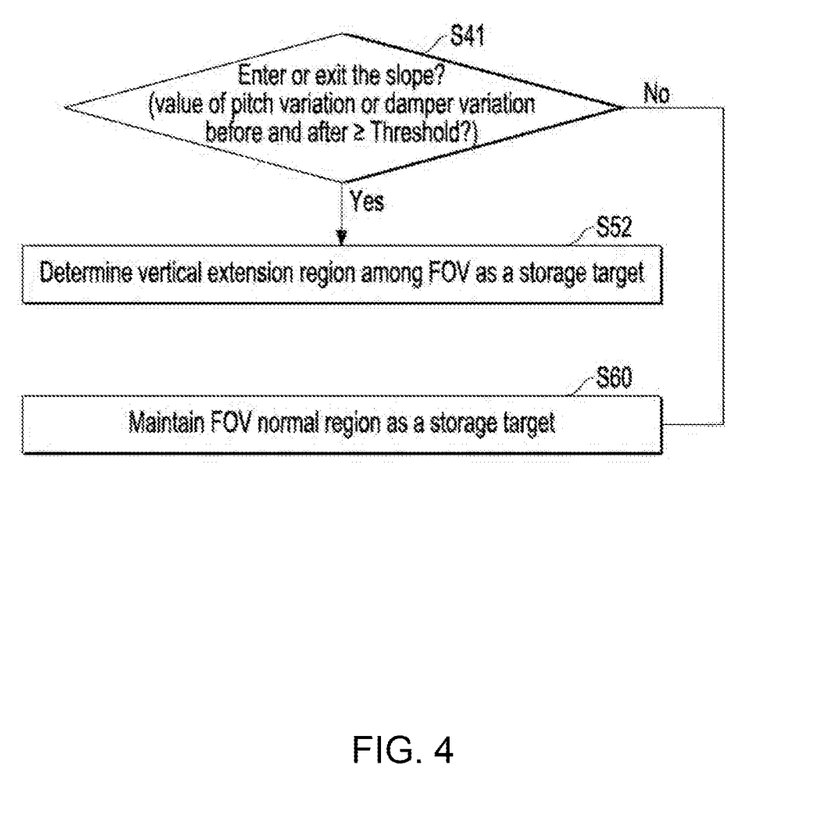
FIG. 4 is a flowchart illustrating a vertical-view extension condition and a control according thereto according to an embodiment of the present disclosure.

The vertical-view expansion condition may include a condition of entering or exiting a slope, as shown in FIG. 4.

Further, whether the vehicle enters or exits the slope may be determined by a pitch change amount (or a change rate per hour) of the vehicle or whether a load change amount (or a change rate per hour) of the front and/or rear dampers is equal to or greater than a threshold value.

If it is determined that the vehicle enters or exits the slope in step S41, the built-in cam controller BCC determines the vertical expansion region as the storage region in step S52, and otherwise, the step S60 is performed.

FIGS. 6 to 10 illustrate a situation of a view condition according to an embodiment of the present disclosure, which will be described below.

Figure 6:
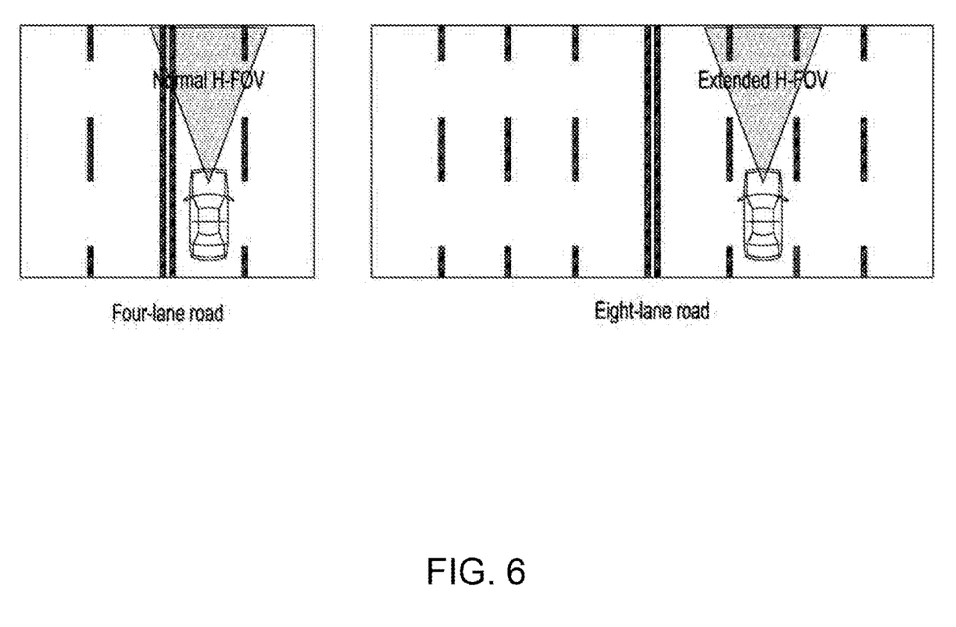
FIGS. 6 to 10 illustrate a situation of a view condition according to an embodiment of the present disclosure.

As shown in FIG. 6, in the case of a four-lane road, a normal region may be stored, and in the case of driving on an eight-lane road, a horizontally expanded region may be stored.

Figure 7:
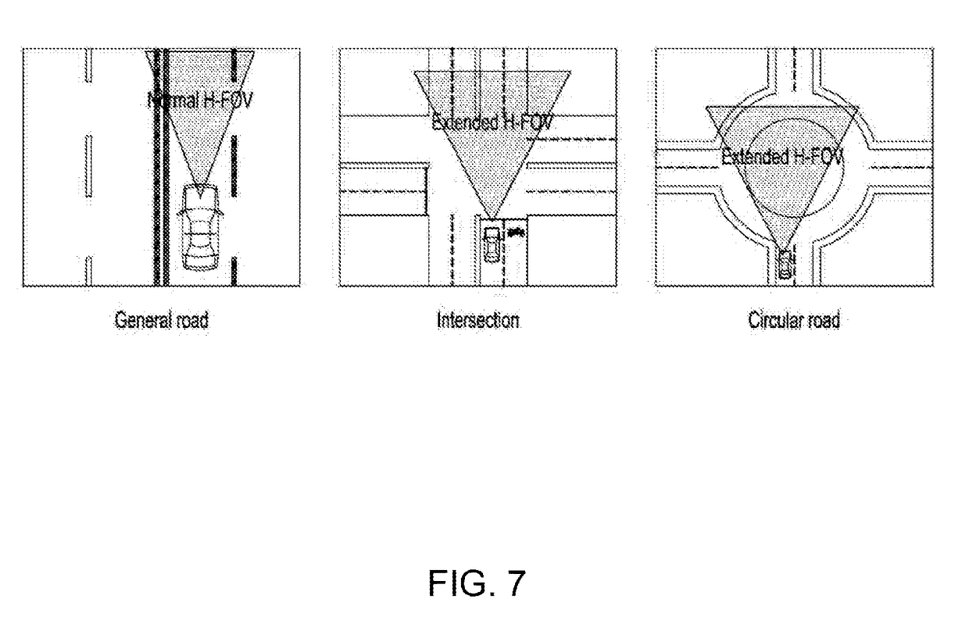

Further, as shown in FIG. 7, when the vehicle travels on a general road, the normal region may be stored, and when the vehicle enters an intersection or a circular road, the horizontal expansion region may be stored.

Figure 8:
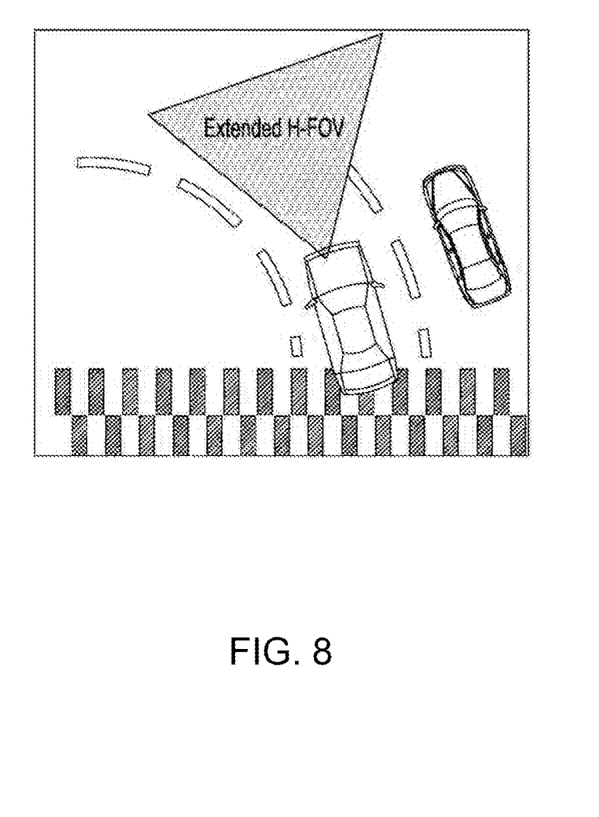

In addition, as shown in FIG. 8, when the warning situation information is received from the ADAS system controller, the storage region may be changed from the normal region to the horizontally expanded region and video is stored therein.

Figure 9:
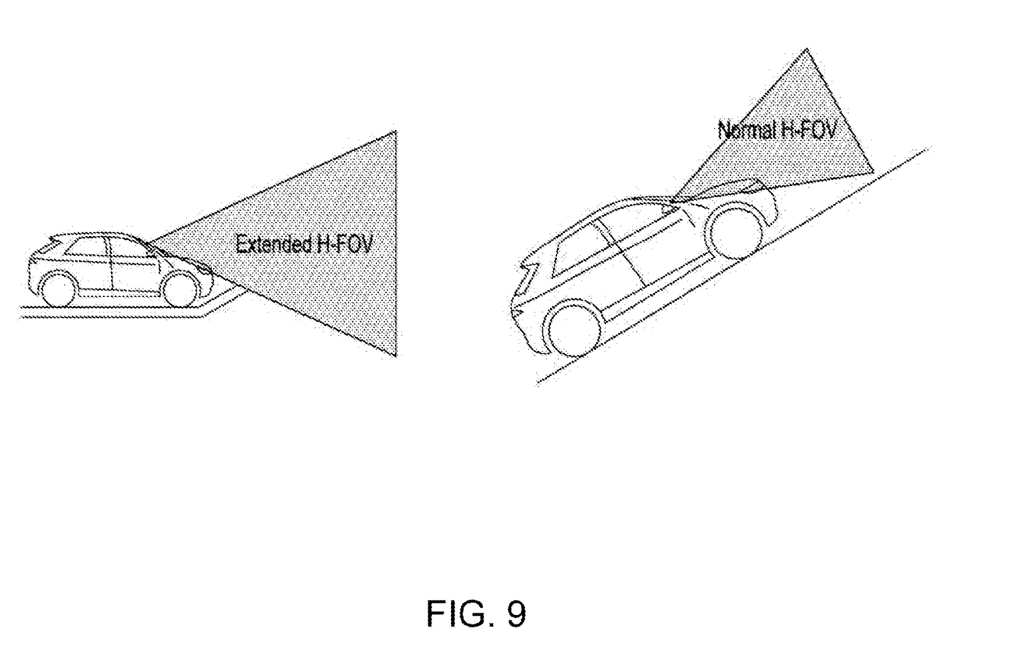

FIG. 9 illustrates an entry into a slope, and in the present embodiment, it is determined that the vehicle enters the slope (left figure) if a pitch change amount or a load change amount of the front and/or rear damper is equal to or greater than a threshold value to enter the slope (left figure). Accordingly, the vertical expansion region is stored, and then, after completely entering the slope (right figure), the vertical expansion region is changed to a normal region.

Figure 10:
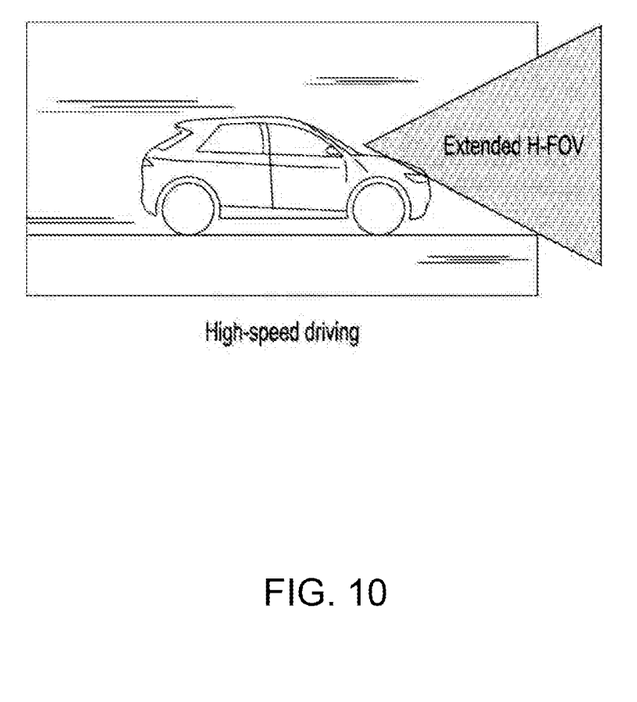

Further, as shown in FIG. 10, when the speed of the vehicle is equal to or greater than the threshold speed, the storage region is changed to the vertical expansion region and video is stored therein.

As shown in FIG. 6, an afterimage image (an area surrounded by a dotted line) appears surrounding the wiper in the picture above, whereas there is no afterimage at all in the picture below.

Although the embodiments of the present disclosure have been disclosed hereinabove, it may be understood by those skilled in the art that the present disclosure may be variously modified and altered without departing from the scope and spirit of the present disclosure described in the following claims.

What is claimed is:

1. A controlling method of a driving video recording system, the controlling method comprising:
providing a camera module to monitor surroundings of a vehicle, a first memory to store an image transmitted from the camera module, a second memory to store a computer program for controlling storage of the image, and a controller including a processor to execute the computer program;

determining, by the processor, whether a view condition is satisfied through execution of the computer program;

selecting, the processor, one of a first region or a second region for a field of view (FOV) of the camera module according to the determination; and determining to store the image obtained by the camera module according to the selection, wherein the view condition includes a horizontal-view expansion condition or a vertical-view expansion condition, and wherein the horizontal-view expansion condition includes at least one of a condition that the number of lanes of a road on which the vehicle travels is equal to or greater than a threshold number of lanes, a condition that the vehicle enters an intersection or a circular road, a condition that the speed of the vehicle is equal to or greater than a threshold speed, a condition that a steering angle or a yaw angle is equal to or greater than a threshold angle, or a condition that an Advanced Driving Assistance System (ADAS) warning situation occurs.

2. The controlling method of claim 1, wherein the second region includes a horizontal expansion region having a horizontal length greater than that of the first region.

3. The controlling method of claim 1, wherein the vertical-view expansion condition includes a condition of one of entering or exiting a slope.

4. The controlling method of claim 3, wherein the condition that the vehicle enters or exits the slope is determined according to one of a pitch variation of the vehicle or a load variation of the front and rear dampers.

5. The controlling method of claim 3, wherein the second region includes a vertical expansion region having a vertical length greater than that of the first region.

6. The controlling method of claim 1, further comprising determining, by the processor, whether the current time zone is a daytime time zone in addition to the view condition.

7. The controlling method of claim 6, further comprising allowing, by the processor, selection of the second region in the case of the daytime time zone.

8. The controlling method of claim 7, further comprising determining, by the processor, whether the current time zone is the daytime time zone using an auto gain control gain value of the camera module.

9. A driving video recording system comprising:
a camera module configured to monitor surroundings of a vehicle;
a first memory configured to store an image transmitted from the camera module; and
a controller including a second memory configured to store a computer program for controlling storage of the image, and a processor configured to execute the computer program,
wherein the processor is configured to:
determine whether a view condition is satisfied through execution of the computer program,
select one of a first region or a second region for a field of view (FOV) of the camera module according to the determination, and
determine whether to store the image obtained by the camera module according to the selection,
wherein the view condition includes at least one of a horizontal-view expansion condition or a vertical-view expansion condition, and
wherein the horizontal-view expansion condition comprises at least one of a condition that the number of lanes of a road on which the vehicle travels is equal to or greater than a threshold number of lanes, a condition that the vehicle enters an intersection or a circular road, a condition that the speed of the vehicle is equal to or greater than a threshold speed, a condition that one of a steering angle or a yaw angle is equal to or greater than a threshold angle, or a condition that the vehicle is in a warning situation of an advanced driving assistance system (ADAS).

10. The driving video recording system of claim 9, wherein the second region includes a horizontal expansion region having a horizontal length greater than that of the first region.

11. The driving video recording system of claim 9, wherein the vertical-view expansion condition includes a condition of one of entering or exiting a slope.

12. The driving video recording system of claim 11, wherein the condition of one of entering or exiting a slope is determined according to one of a pitch change amount of the vehicle or a load change amount of the front and rear dampers.

13. The driving video recording system of claim 11, wherein the second region includes a vertical expansion region having a vertical length greater than that of the first region.

14. The driving video recording system of claim 9, wherein the processor is further configured to determine whether a time zone is a daytime time zone in addition to the view condition.

15. The driving video recording system of claim 14, wherein the processor is further configured to allow selection of the second region in the case of the daytime time zone, and the processor is further configured to determine whether the current time zone is the daytime time zone using an auto gain control gain value of the camera module.

16. A vehicle comprising the driving video recording system of claim 9.

* * * * *